Sept. 19, 1967 G. J. PRAGER 3,342,014
ROLL WRAPPER
Filed Sept. 29, 1964 11 Sheets-Sheet 3

INVENTOR.
GEORGE J. PRAGER
BY
ATTORNEYS

FIG. 6

Sept. 19, 1967  G. J. PRAGER  3,342,014
ROLL WRAPPER
Filed Sept. 29, 1964  11 Sheets-Sheet 6

FIG. 7

INVENTOR
GEORGE J. PRAGER
BY
ATTORNEYS

FIG.12

United States Patent Office 3,342,014
Patented Sept. 19, 1967

3,342,014
ROLL WRAPPER
George J. Prager, Rosemont, Pa., assignor to Beloit Eastern Corporation, Downingtown, Pa., a corporation of Delaware
Filed Sept. 29, 1964, Ser. No. 400,140
17 Claims. (Cl. 53—214)

ABSTRACT OF THE DISCLOSURE

Automatic wrapping apparatus for wrapping rolls of paper coming directly from the mill so arranged that the sizes of the rolls may readily be intermixed without altering operation of the apparatus. A roll of paper is centered and fed sidewise to a wrapping station and is then fed endwise to the banding, crimping and heading station. The various stations may be combined to effect wrapping, crimping, banding and heading in a single station or in a series of aligned stations depending upon the space available in the mill. The system is particularly adapted for automatic operation by placing I.B.M. cards in a control instrument or by using similar memory equipment to instigate and carry out the various operations of the system.

---

This invention relates to improvements in apparatus for wrapping rolls of paper and the like.

A wrapper mechanism has recently been developed for wrapping rolls of paper by machine which may be automatically controlled to retain the identity of the roll and know the type and weight of paper in the roll after it is wrapped, and to take care of varying diameters and widths of the rolls and to enable the rolls to be wrapped with one or more plies of wrapping paper.

The present invention is arranged to increase the efficiency of the wrapping operation and substantially decrease the time of wrapping by conveying a centered roll of paper to a wrapping station or stations along its axis by conveying means lifting the roll of paper to convey the roll of paper to axially aligned wrapping stations and then lowering the roll of paper at the wrapping stations.

By the present invention the size and weight of the roll of paper and its identity can be determined at the head end of the wrapping apparatus and the roll of paper may be wrapped, banded and crimped either in one station or in a series of stations arranged in aligned relation, depending upon the space available and the needs for wrapping. The roll of paper may first be centered and then transferred to a step by step conveyor in centered relation with respect to the conveyor, travelling the distance between the center lines of the various wrapping stations to retain the roll in centered relation with respect to the station for each wrapping operation, and the identity of the roll may be retained throughout its travel through the machine so that rolls delivered to the machine can be intermixed without losing their identity at the delivery end of the machine.

The wrapper of the present invention further is arranged to automatically control and effect the performance of the operations for wrapping the roll, including the centering and conveying of the roll and the applying of one or more plies of wrapping paper to the roll and then banding, either with edge bands or edge bands and chafe bands spaced further in from the ends of the roll than the edge bands, and crimping and heading the roll and then discharging the roll for weighing and marking in automatically timed relation with the operation which consumes the longest time, controlling the other operations, so that rolls can be sequentially fed through the machine at an optimum speed and with optimum operating efficiency.

A principal object of the present invention is to provide a novel and improved form of apparatus for wrapping rolls of paper or like material under automatic, semi-automatic or manual control in a simpler and more expeditious manner than former wrapping apparatus.

A further object of the invention is to provide a novel and efficient wrapping apparatus for automatically wrapping intermixed rolls of paper or like materials of various roll diameters and widths.

A further object of the invention is to provide a roll wrapping apparatus and system in which wrapping, banding and crimping of the roll may be attained in one or a series of axially aligned wrapping stations.

Still another object of the invention is to provide an improved apparatus for wrapping rolls of paper, arranged with a view towards ready adaptability for operation by placing I.B.M. cards in a control instrument (or using similar memory equipment) instigating and carrying out a wrapping operation.

A still further object of the invention is to provide an improved form of wrapper in which the roll of paper is supported on rotatable drums at the various wrapping stations and a conveyor spaced between the drums is operable to lift the centered roll of paper above the drums and is indexed to convey the roll of paper along the drums and lower the roll of paper in centered relation at each wrapping station.

A further object of the invention is to provide a roll wrapping apparatus and system providing a higher production rate of wrapping rolls of paper of various widths and diameters than formerly and so arranged that the rolls may be intermixed.

A still further object of the invention is to provide an apparatus for wrapping rolls of paper and the like having an improved form of centering mechanism at the entering end of the apparatus, to one side of a conveyor indexed to travel distances equal to the distance between stations for each indexing movement of the roll, and centering the roll and discharging the centered roll onto the conveyor, maintaining the roll centered at each wrapping station.

Still another object of the invention is to provide an improved form of roll wrapping apparatus having a novel form of banding and crimping mechanism arranged to band and crimp the wrapper at a single wrapping station.

Still another object of the invention is to provide an improved form of roll wrapping apparatus having a novel conveying mechanism for advancing the rolls axially of the axes about which the rolls are wound to a series of sequential wrapping stations.

A still further form of the invention is to provide an improved form of bander for placing end bands or end bands and chafe bands on wrapped rolls of paper in a simpler manner than formerly.

Still another object of the invention is to provide a simplified and improved crimper which may crimp the wrapper over the ends of the roll of paper either simultaneously with or separately from the wrapping operation.

These and other objects of the invention will appear from time to time as the following specification proceeds and with reference to the accompanying drawings wherein:

Figure 1:
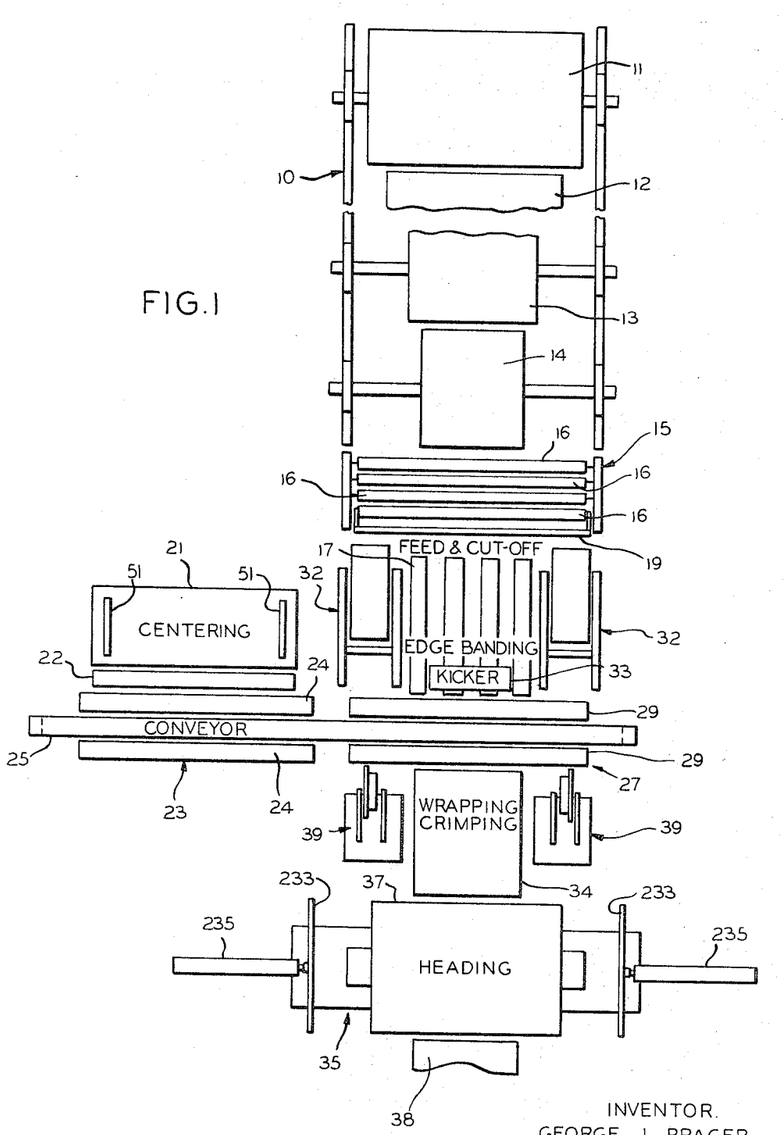
FIGURE 1 is a diagrammatic plan view of a form of a roll wrapper constructed in accordance with the principles of the present invention in which wrapping, banding and crimping are performed in a single wrapping station.

In FIGURE 1 of the drawings I have diagrammatically shown a combined cascade and in-line wrapping system including a storage stand 10 for a series of rolls of wrapping paper 11, 12, 13 and 14 of different widths, supported in the stand for unwinding about horizontal transverse axes. Each roll of wrapping paper may wrap a different width of roll of paper, and the wrapper webs from the various rolls are trained to a feeder 15, for individually feeding intermingled widths of paper in accordance with the width of roll to be wrapped. The feeder 15 may be of a type similar to that shown and described in my application Ser. No. 306,804, filed Sept. 9, 1963, and entitled, "Wrapper Feed for Roll Wrapper," now Patent No. 3,290,861, and no part of the present invention so need not herein be shown or described in detail. The feeder generally includes individual sets of pinch rolls 16 that are driven to supply paper between conveyor tapes 17 to a wrapping station 27. At the discharge end of the feeder and receiving ends of the conveying tapes 17 is a cut off knife 19 cutting the wrapper web to length in accordance with the diameter of the roll and the number of plies of paper to be wrapped about the roll.

The apparatus also includes a centering station 21 centering the roll and transferring the roll along a ramp 22 to a conveying station 23 arranged in cascade relation with respect to said centering station.

The conveying station 23 generally includes two freely rotatable roll supporting drums 24 having a conveyor 25 movable therebetween and adjustable upwardly to lift a centered roll from the drums 24 and convey the roll in centered relation with respect to the wrapping, edge banding and crimping station 27.

The conveyor 25 is intermittently driven distances equal to the distance between the center lines of the centering and wrapping stations to convey a centered roll of paper into centered relation with respect to the wrapping, edge banding and crimping station 27. In this position of the roll, the conveyor 25 is lowered to lower the centered roll of paper onto two parallel spaced rotatably driven wrapper drums 29, 29 supporting and rotating the roll and drawing a wrapper web having a glued inner edge in the nips between the roll of paper and the drums 29, to adhesively secure the leading edge of the wrapper to the roll of paper. The roll of paper is then wrapped by continued rotation of the roll of paper in accordance with the number of plies to be wrapped about the roll of paper. At the wrapping station the edges of the wrapped roll of paper are banded. The wrapped roll may also be banded inwardly of the edges of the roll with chafe bands where required.

Crimpers 39 are provided at each side of the wrapping station adjacent opposite ends of the rolls 29 and at the opposite side of the wrapping station from the edge banders 32 to crimp the over-hanging edges of the wrapper inwardly into engagement with opposite ends of the roll of paper.

Between the edge banders 32 is a kicker 33 kicking the wrapped, banded and crimped roll of paper from the conveyor 25 along the ramp 34 to a header 35, applying outside heads to the wrapper crimped over the edges of the roll of paper. In association with the kicker and disposed therebeneath are glue guns 36, gluing the leading edge of the wrapper to cause the wrapper to adhere to the roll of paper as it travels in the nip between the drum 29 and a roll of paper 37, supported thereon and rotatably driven thereby.

A roll of paper 37 may be delivered to the centering station in a suitable manner and when centered may be transfered laterally along the ramp 22 to the conveying station. The roll may then be lifted by the conveyor 25 above the rotatable support drums 24 and conveyed in an axial direction to the wrapping station 27. At this station the roll may be lowered into centered relation with respect to the wrapper feed 15. The selected pinch rolls 16 may then be rotatably driven by the energization of clutch means (not shown), to feed a selected width of wrapper from a storage roll 11, 12, 13 or 14, in accordance with the width of the roll to be wrapped, to the tape conveyor 17. The tape conveyor 17 conveys the wrapper to the wrapping station for gluing the leading edge thereof by the glue guns 36 and feeds the wrapper into the nip between an advance rotatably driven support drum 29 and the roll of paper 37, to cause the wrapper to adhere to the roll of paper and be wound thereabout by rotation thereof. When the required length of wrapper has been drawn by the tape conveyors 17 and drum 29 to wrap the roll of paper with one ply or any number of plies required, the cutter 19 may then be energized to shear the wrapper to length, and to thereby supply a length of wrapper sufficient to wrap the roll with the number of plies required. As the roll is wrapped, the edge banders 32 will move inwardly and band the opposite edges of the roll as will hereinafter more clearly appear as this specification proceeds.

The crimpers 39, 39 may then crimp the overhanging ends of the wrapper inwardly into engagement with opposite ends of the roll. The conveyor 25 may then raise the wrapped, banded and crimped roll of paper above the rolls 29 and the kicker 33 may give the roll a slight kick causing the wrapped roll of paper to roll along the ramp 34 to the header 35 for the application of outside heads to the inwardly crimped wrapper.

Figure 2:
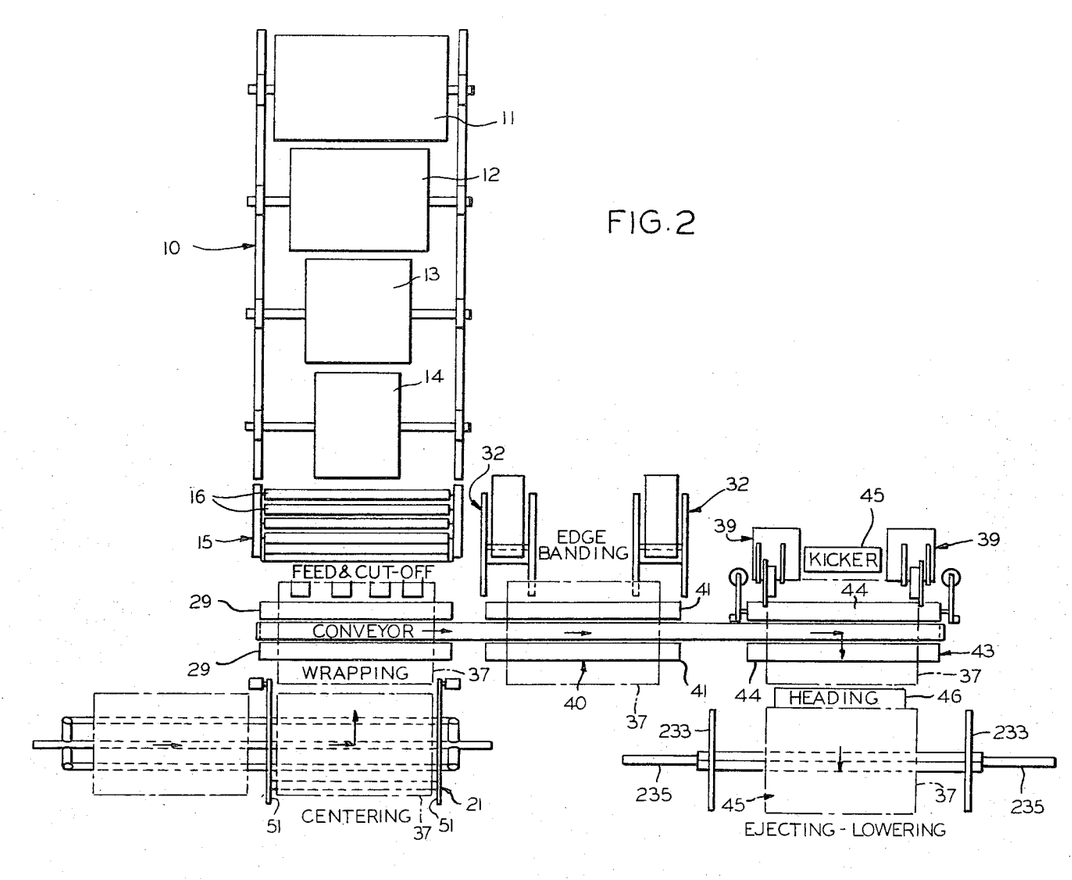
FIGURE 2 is a diagrammatic plan view of a roll wrapper constructed in accordance with the principles of the present invention in which wrapping, banding and crimping are performed in a series of individual axially aligned stations.

In the form of the invention illustrated in FIGURE 2, separate in-line wrapping, edge banding, crimping and transfer stations are provided. In this form of the invention the centering mechanism is in cascade relation with respect to the wrapping stations and the centered roll is transferred to the wrapping station by tilting of the centering mechanism, to allow the roll to slowly roll from said centering mechanism along a suitable ramp onto the drums 29, 29 at the wrapping station. The conveyor 25 may then elevate a wrapped roll of paper above the supporting surface of the drums 29, 29 and transfer the roll of paper to a separate axially aligned edge banding station 40, and lower the roll of paper onto rotatably driven support drums 41, 41 at the edge banding station for banding the edges of the roll or for chafe banding the roll inwardly with the edges thereof. At the termination of the edge banding operation, the conveyor 25 may then raise the banded roll of paper above the rotatably driven drums 41, 41 and transfer the roll of paper axially into centered relation with respect to a crimping station 43. The conveyor may then lower the roll of paper to be supported on rotatably driven drums 44, 44 at the crimping station.

A kicker 45, like the kicker 33 may transfer the roll of paper from the supporting flights of the conveyor 25, upon raising of the roll of paper above the drums 44, 44, along a ramp 46 to a header station 47, tilted to receive the roll of paper for the application of outside heads to the crimped end portions of the wrapper extending inwardly along the roll. At the termination of the heading operation the roll of paper may be ejected by tilting of the support rails for the roll, causing the roll to roll along a suitable ramp (not shown) to a weighing and labeling station (not shown).

In this form of in-line wrapper, centering, wrapping, edge banding and crimping being performed in separate in-line stations, one roll of paper may be wrapped while a next preceding wrapped roll of paper is being edge banded, while a third preceding roll of paper is at the crimping station for crimping of the wrapper along the ends of the roll of paper. Another preceding roll of paper may be at the heading station. Thus a plurality of operations may be simultaneously performed on three of four different rolls of paper with a resultant speeding up of the overall wrapping operation.

In the form of the invention illustrated in FIGURE 1, however, there is no transfer time required to transfer the rolls from one station to another, which partially balances the performing of different operations on different in-line rolls of paper.

Figure 5:
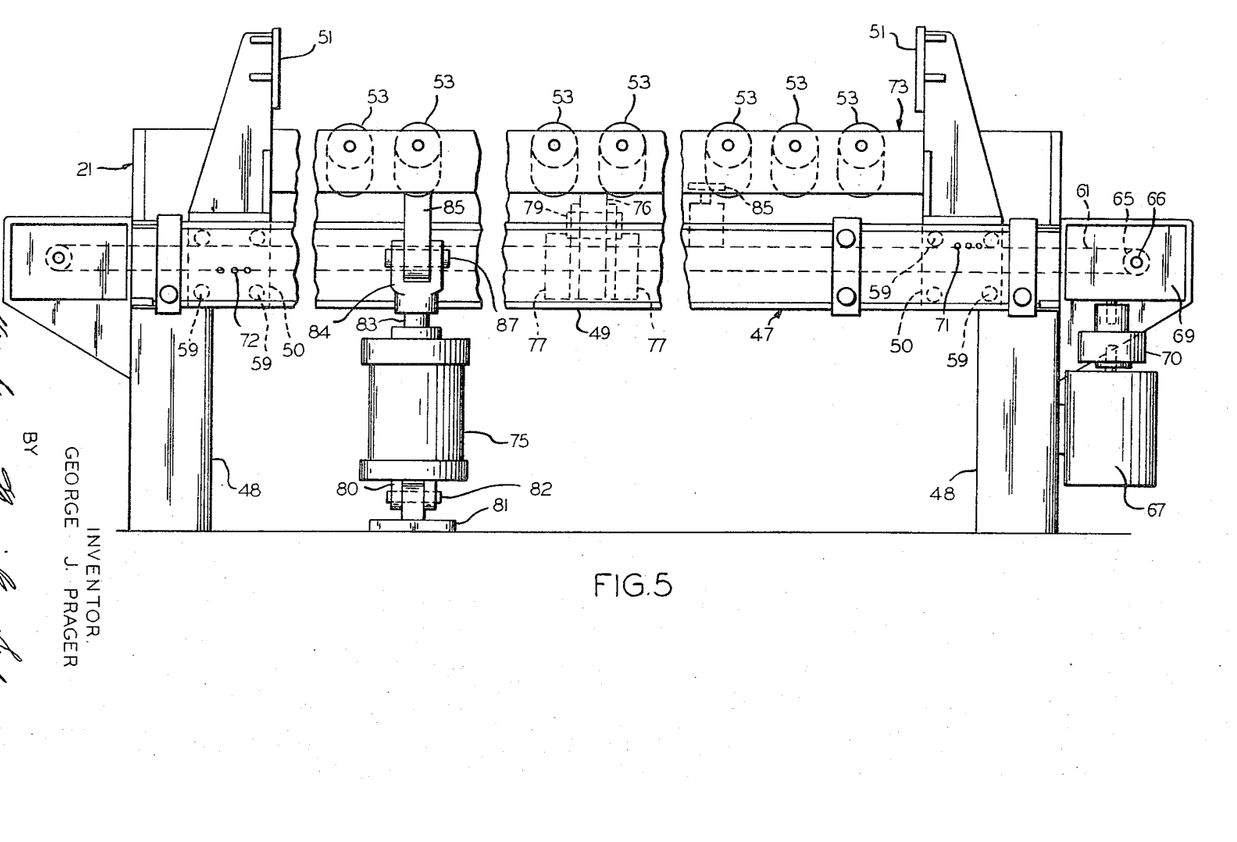
FIGURE 5 is a fragmentary view in side elevation of a centering mechanism for centering the rolls of paper for wrapping.
Figure 6:
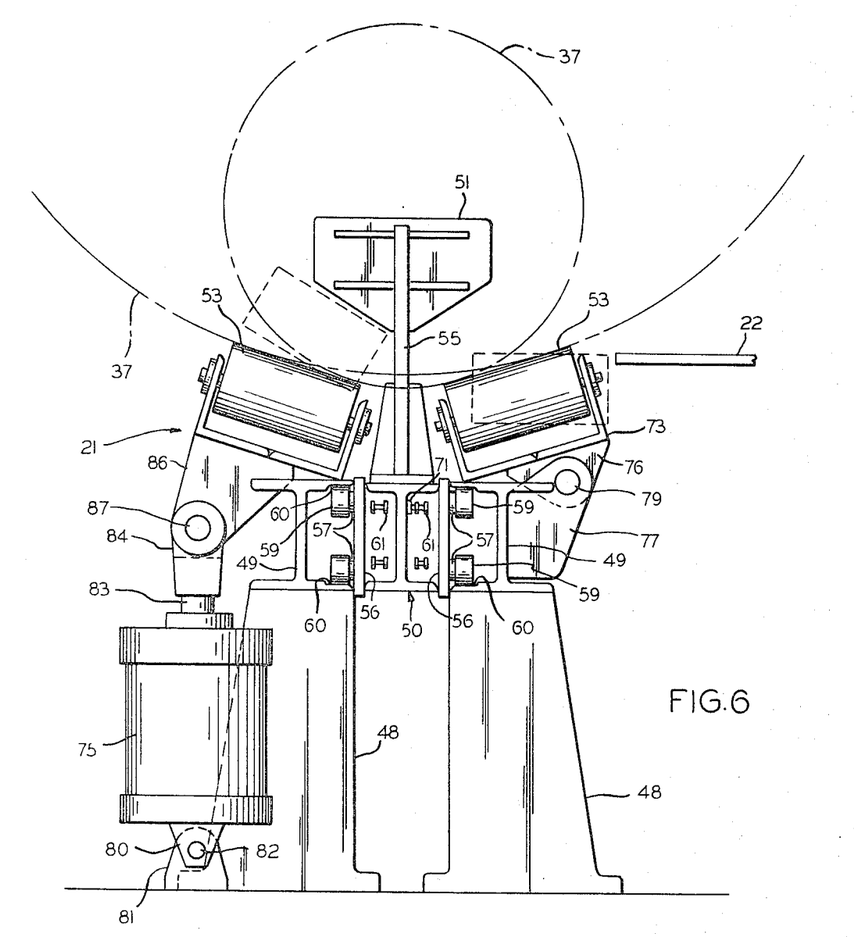
FIGURE 6 is a fragmentary end view of the centering mechanism shown in FIGURE 3.

The centering station 21, as shown in FIGURES 5 and 6, includes a frame structure 47 mounted adjacent its opposite end portions on parallel longitudinally and laterally spaced standards 48, 48 suitably mounted on and extending upwardly from the floor.

The frame structure 47 is shown in FIGURE 6 as comprising a pair of parallel spaced I-beams 49, supported on the tops of the standards 48 and spaced apart to form a track for carriages 50, 50 supporting centering platens 51. The centering platens 51 extend upwardly of the carriages 50 and are driven to move inwardly together at the same rates of speed and engage opposite ends of the roll of paper, and move the roll of paper along troughed rollers 53 into a centered position to be transferred to the conveyor 25.

As shown in FIGURE 6 the carriage 50 is in the form of an I-beam. A leg 55 projects upwardly from the top flange thereof and forms a support for the platen 51. The carriage also has parallel spaced vertically extending plates 56 extending along the outer edges of the flanges thereof and welded or otherwise secured thereto. The plates 56 form supports for pins or shafts 57 forming bearing mountings for vertically and longitudinally spaced rollers 59 riding on tracks 60 formed in the facing surfaces of the flanges of the I-beams 49.

The platens 51 are moved equal distance inwardly toward each other to center the roll by endless chains 61, trained about idler sprockets 62 on shafts 63 at one end of the structure 47, and trained about drive sprockets 65 on transverse shafts 66 at the opposite end of the frame structure 47, The shaft 66 and drive sprockets 65 are driven from a drive motor 67 driving suitable speed reducer gearing (not shown) in a speed reducer housing 69 mounted on and extending outwardly of one side of the frame structure 47. The drive from the motor 67 to the speed reducer gearing and transverse shaft 66 is through a coupling 70. The drive motor 67 may be an air drive motor of a conventional form, which stalls when the paddles or platens 51 have centered the roll with respect to the conveyor 25. One endless chain 61 is connected with one platen 51 through a connector 71 connected to the upper run of said chain. The other endless chain 61 is connected to the platen 51 through a connector 72 connected with the next adjacent endless chain 61.

It should here be understood that while I have described each platen 51 as being connected with a separate endless chain, that one platen may be connected with the top run of an endless chain 61 while the opposite platen may be connected to the bottom run of the same endless chain if desired.

Figure 4:
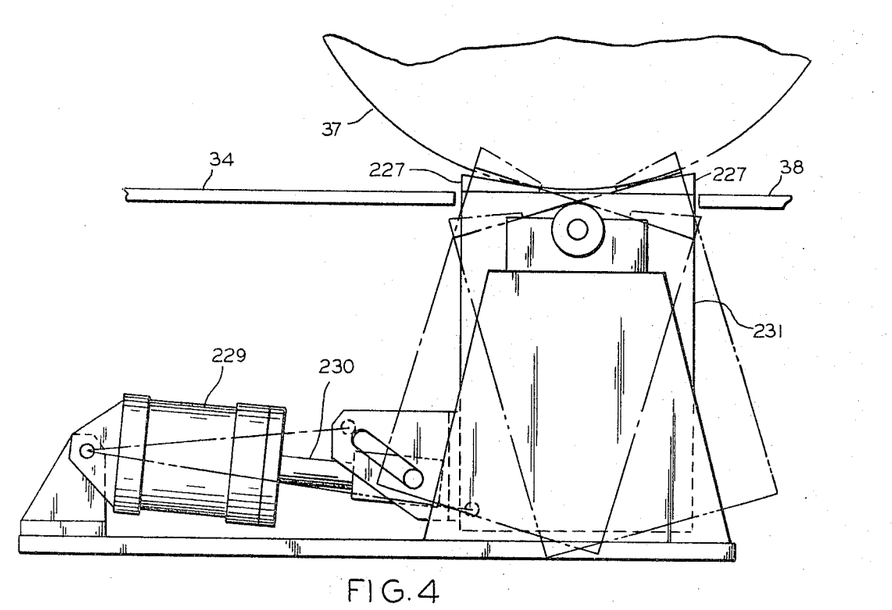
FIGURE 4 is a diagrammatic detail side view showing a portion of the header in side elevation.

The troughed rollers 53 are mounted on a tiltable bed frame 73, tiltable at the termination of a centering operation from the solid to the dotted line position shown in FIGURE 4 to eject a roll of paper to roll along the ramp 22 onto the in-line conveyor 25. Tilting of the bed frame 73 and rollers 53 may be under the control of a stall detector (not shown) detecting stalling of the motor 67, or by a suitable timing device, (not shown) controlling the supply of fluid under pressure to the head end of a tilting cylinder 75.

Figure 3:
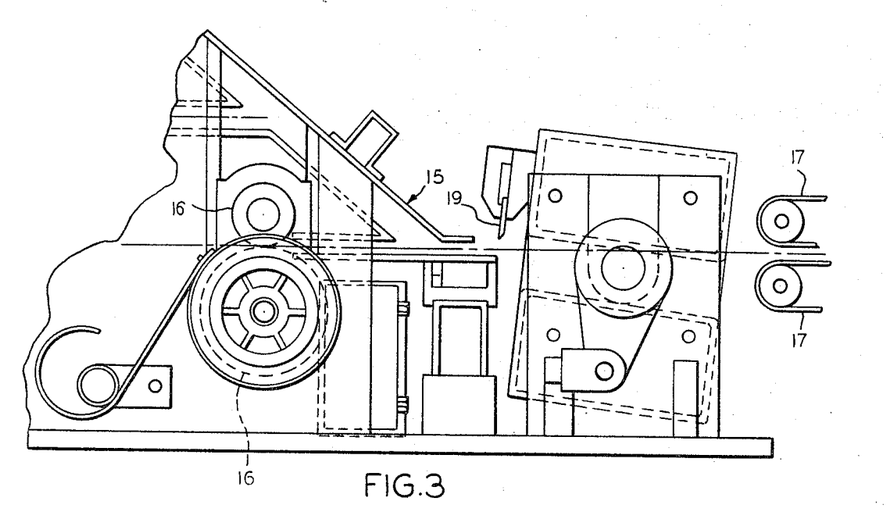
FIGURE 3 is a diagrammatic detail view, showing a portion of the wrapper feed, cutter and tape conveyor in side elevation.

As shown in FIGURES 3 and 6, the bed frame 73 has an ear 76 extending angularly downwardly therefrom between connectors 77 extending outwardly and upwardly of an outer I-beam 49 of the frame structure 47. A pivot pin 79 extending perpendicularly to the axes of the troughed rollers 53 is provided to pivotally connect the ears 76 between the connectors 79.

The cylinder 75 is at the opposite side of the bed frame 73 from the pivot pins 79 and has spaced connectors 80 depending from its head end, connected to a connector bracket 81 on a pivot pin 82. The connector bracket 81 may be mounted on and extend upwardly of the foundation for the apparatus. A piston rod 83 extends upwardly from a piston (not shown) movable along the cylinder 75 and has a connector 84 on the upper end thereof extending along opposite sides of a depending ear 85 and pivotally connected thereto, as by a pivot pin 87. The ear 85 is welded or otherwise secured to the bed frame 73 on the opposite side thereof from the ear 76, to effect tilting movement of said bed frame and the rollers 53, journalled in said bed frame, upon extensible movement of the piston rod 83.

A suitable indicator (not shown) may then indicate the width of the roll to be wrapped and a control circuit may be established to energize a clutch driving a selected set of pinch rolls 16, to feed the web of wrapper determined by the width of the paper required to wrap the roll. The pinch rolls may all be driven by a single motor, operating constantly and selectively connected to the pinch rolls by clutches.

The diameter of the roll may also be gauged at the centering and gauging station by a thickness transducer 85 mounted between the troughed rolls 53 on the vertical center line of the roll being centered and gauged. The thickness transducer 85 may be of a well known form and determines the length of the paper wrapper by a time delay in the wrapper cut-off knife 19. When the transducer probe is in its fully retracted position there will be the equivalent of a zero time delay and as the probe is advanced toward the roll, the point of contact of the probe with the roll can represent a specific time delay other than zero. Since the largest roll diameter represents the minimum of curvature, the probe must travel farther to engage the roll and is at a maximum extension at this point, giving a maximum time delay in operation of the cut-off knife and a maximum wrapper length.

A suitable timer (not shown) may be provided in the circuit to the shear 19. The timer may be so selected that the timing, and consequently the wrapper length, is a composite of the diameter of the roll plus a fixed percentage of approximately 15%. This enables the timer to give an additional length for an overlap, which is required on a single wrap.

The ramp 22 has a slight slope so that a roll ejected from the centering mechanism 21 by tilting movement of the troughed rollers 53 to the dotted line position shown in FIGURE 6, will slowly roll along the ramp 22 onto the drums 24, 24 of the conveyor 25, to be conveyed to the wrapping station 27 in centered relation with respect thereto. The drums 24, 24 are suitably mounted at their opposite ends on standards 88 extending to each side of a frame 89 for the conveyor, for rotation about horizontal axes extending parallel to the axis of the roll 37. The frame 89 is supported adjacent its ends and intermediate its ends for vertical movement to engage flights 90 of the conveyor with a roll of paper 37 and lift the roll above the roll supporting surfaces of the drums 24, to be conveyed in the direction of the axis of the roll 37 to the wrapping station 27 in centered relation with respect thereto.

Figure 7:
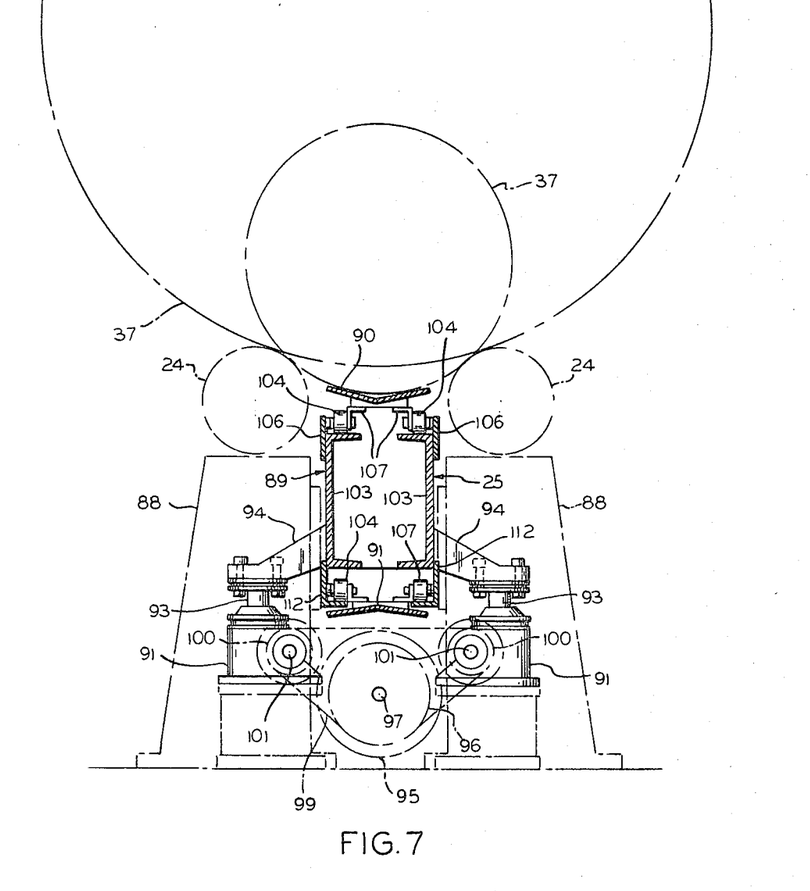
FIGURE 7 is a fragmentary transverse sectional view of the conveyor for conveying the roll of paper in centered relation to a series of axially aligned wrapping stations.
Figures 8, 9:
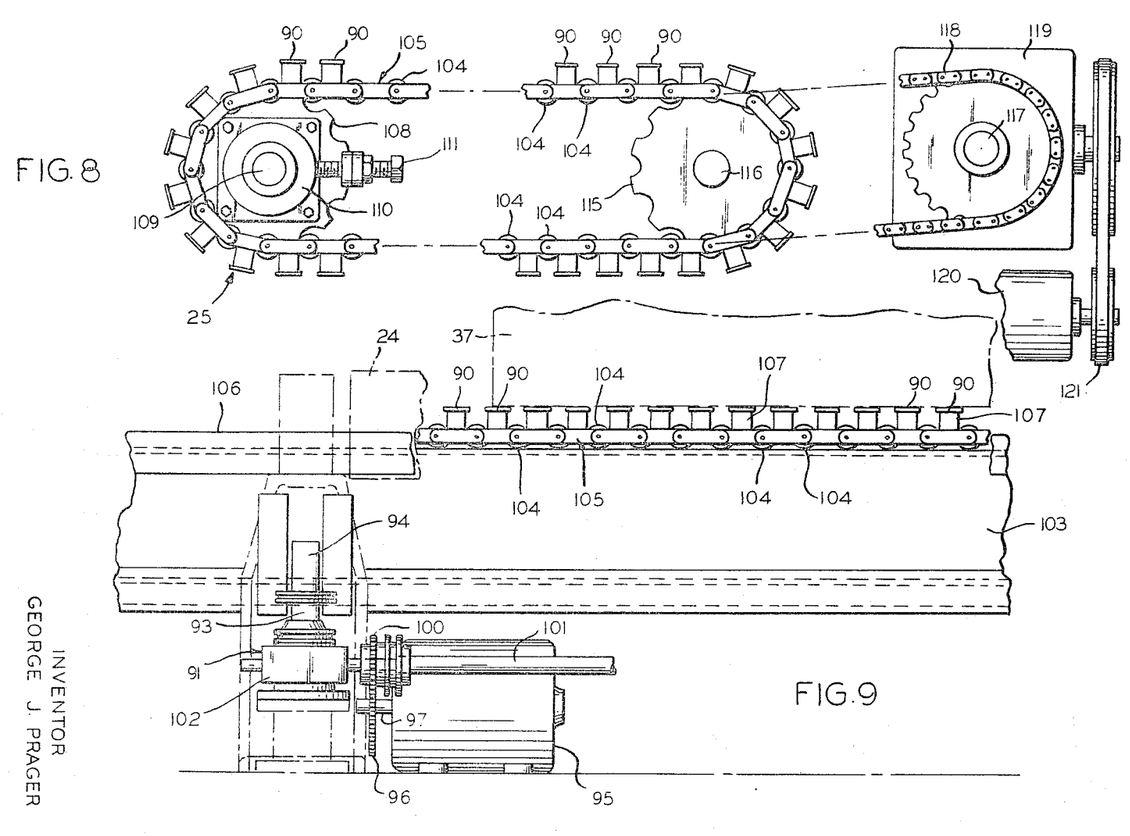
FIGURE 8 is a fragmentary detail view in side elevation with certain parts removed in order to show the conveyor and drive therefor.
FIGURE 9 is a fragmentary view in side elevation with parts taken away and certain other parts removed in order to show certain other details of the conveyor which are not shown in FIGURE 6.

As shown in FIGURES 7 and 9, spaced screw jacks 91, 91 are provided at opposite sides of the frame 89 and are mounted on the base or foundation for the conveyor. The screw jacks 91 may be conventional forms of jacks, such as the Duff-Norton 1805 jack, and each includes an extensible power member or screw 93 abutting the undersurfaces of yoke-like arms 94 extending laterally from opposite sides of the frame 89. The screw jacks 93 are rotated at the same rates of speed by a motor 95 disposed between said jacks. A drive sprocket 96 on a motor shaft 97 has a drive chain 99 extending thereunder and meshed therewith and angularly upwardly of opposite sides thereof around drive sprockets 100 on parallel longitudinal shafts 101 journalled in worm housings 102, for driving said screw jacks in a conventional manner, to raise and lower the threaded rods or power members 93, 93. The shafts 101 may extend for the length of the conveyor and form drive members for other screw jacks 91 (not shown) spaced longitudinally along the frame 89 to simultaneously operate all of said screw jacks, and raise and lower the conveyor 25 into a plurality of horizontal planes.

The jacks 91 may be operated under control of the control system for the wrapping mechanism at the finish of the slowest function or operation of wrapping that is, wrapping, banding and crimping where these operations are in-line operations as shown in FIGURE 2.

The conveyor frame 89 includes a pair of parallel spaced facing channels 103 connected together at suitable intervals. The upper flanges of the channels 103 form support tracks for rollers 104 rotatably mounted between the links of spaced chains 105 of the conveyor on the pintles, pivotally connecting said links together. Retaining plates 106 extend along the outsides of the webs of the channels 103 and upwardly therefrom, to retain the rollers 104 to the top flanges of said channels. The chains 105 have attachments 107 extending inwardly of the inside thereof, forming supports for the flights 90. The chains 105 change their directions of travel about idler sprockets 108 on a transverse idler shaft 109, journalled at its ends in bearing supports 110. A suitable screw type of take-up 111 is provided to take up tension on the chains 105. The return runs of the chains 105 are supported on the rollers 104, rolling along the horizontal legs of angles 112. The angles 112 are secured at their vertical legs to the outer sides of the webs of the channels 103 and depend therefrom. The vertical legs of said angles 112 extend inwardly towards each other to form supporting tracks for the rollers 104. The chains 105 are trained about spaced drive sprockets 115 on a transverse shaft 116 driven from a parallel shaft 117, by a chain and the sprocket drive 118. The shaft 117 is the drive shaft of a speed reducer 119, which may be a conventional form of speed reducer, and is no part of the present invention so need not herein be shown or described further. The speed reducer 119 in turn is driven from a motor 120 through a conventional form of timing belt drive 121 (FIGURE 8).

The motor 120 may be energized under the control of the automatic control for the wrapper after the jacks have raised the conveyor flights 90 and centered roll of paper above the drum 24, 24. A suitable indexing means may be provided in the control for the motor 120, to assure that the conveyor be driven only a distance equal to the distance between the center lines of the various wrapping stations to bring a centered roll of paper on the conveyor 25 in centered relation with respect to the successive wrapping stations each time the conveyor 105 is operated. The control may include a limit switch (not shown), a photoelectric cell (not shown), a timer (not shown), or a mechanical sensing device (not shown), effecting intermittent operation of the conveyor to convey the roll to a wrapping station in centered relation with respect thereto each time the conveyor is operated.

The wrapper feed 15, supplying individual wrapper webs between the tapes 17, 17, is fragmentarily shown in FIGURE 3 and may be like that shown in the previously-mentioned Patent No. 3,290,861, so the description thereof need not be repeated herein.

The tape conveyors 17 may be driven by a suitable motor (not shown) preferably at a higher rate of speed than the feed rolls 16. The upper tape conveyor changes its direction of travel about an idler 122 at the entering end of an upwardly inclined guide chute 123, which may be in the form of wires or Teflon strips. The lower tape conveyor passes beneath a curved entering end 126 of the guide chute 123 arranged to pick up the wrapper from said tape conveyor, and changes its direction of travel about an idler 125 spaced beyond said guide chute. The portion of guide chute 123 adjacent the discharge ends of the tape conveyors 17 is open to provide a space to accommodate the glue guns 36 to spray glue on the wrapper as it passes thereby.

A series of guide strips 129 are spaced from the guide 123, 123 and cooperate therewith to guide the wrapper to pass in the nips between the support drums 29 and roll of paper 37. The guide strips 129 may be a series of spaced strips made from Teflon or a like material, or may be wires.

The glue guns 36 are mounted on a transverse shaft 130, for adjustable movement about said shaft, to spray strips of glue across the leading and trailing ends of the wrapper on the face of the wrapper facing the roll being wrapped. The glue guns 36 may be supplied with glue from a suitable tank (not shown) and may each have a valve (not shown) incorporated therein and operated by air or solenoids in a suitable manner, to place a leading glue swatch on the leading edge of the wrapper and a trailing glue swatch on the trailing end of the wrapper The glue swatches may be approximately four inches long and may stop short of the edges of the wrapper to prevent the glue from running onto the drums 29. Actuation of the glue gun valves may be under the cyclic control of the wrapping mechanism.

The kicker 33 is diagrammatically shown in FIGURE 1 as being a flat plate, extending rearwardly from the incoming side of the nip between the support drum 29 and the roll 31 supported on the drums 29. The kicker 33 is mounted on parallel arms 131 mounted on a shaft 132 for the roll 29, for pivotal movement about the axis of said shaft. Fluid pressure cylinders 133 are provided to tilt said kicker and eject a wrapped roll from the flights 90 of the conveyor 25, as said conveyor is elevated to lift the roll above the drums 29. The cylinders 133 are transversely pivoted at their head ends between furcations of laterally spaced bifurcated brackets 135, extending upwardly of the base or foundation for the machine, on pivot pins 136. A piston rod 137 is extensible from each cylinder and has a connector 139 on its upper end pivotally connected to an ear 140, depending from an associated arm 131, on a pivot pin 141. The cylinders 135 in a form of invention illustrated in FIGURE 1, may be supplied with fluid under pressure at the termination of a wrapping, edge banding and crimping operation upon raising of the conveyor 25 to raise the roll of paper being wrapped above the drums 29, under the cyclic control for the machine. The kicker 33 engaging the periphery of the roll, may thus readily eject the roll to travel along ramp 34 to the header 35.

The wrapper web progressed upwardly along the chute 23 by the tape conveyors 17 will thus be guided to pass into the nip between the leading drum 29 and the roll of paper to adhere to the roll of paper and be wrapped thereabout as the roll is rotated by the drums 29, 29. The drums 29 are both power driven in a suitable manner at higher rates of speed than the speed of travel of the tape conveyor 17 and of the wrapper feed pinch rolls 16 to draw the wrapper web from the feeder and maintain tension on the web and prevent buckling and wrinkling thereof.

Figure 10:
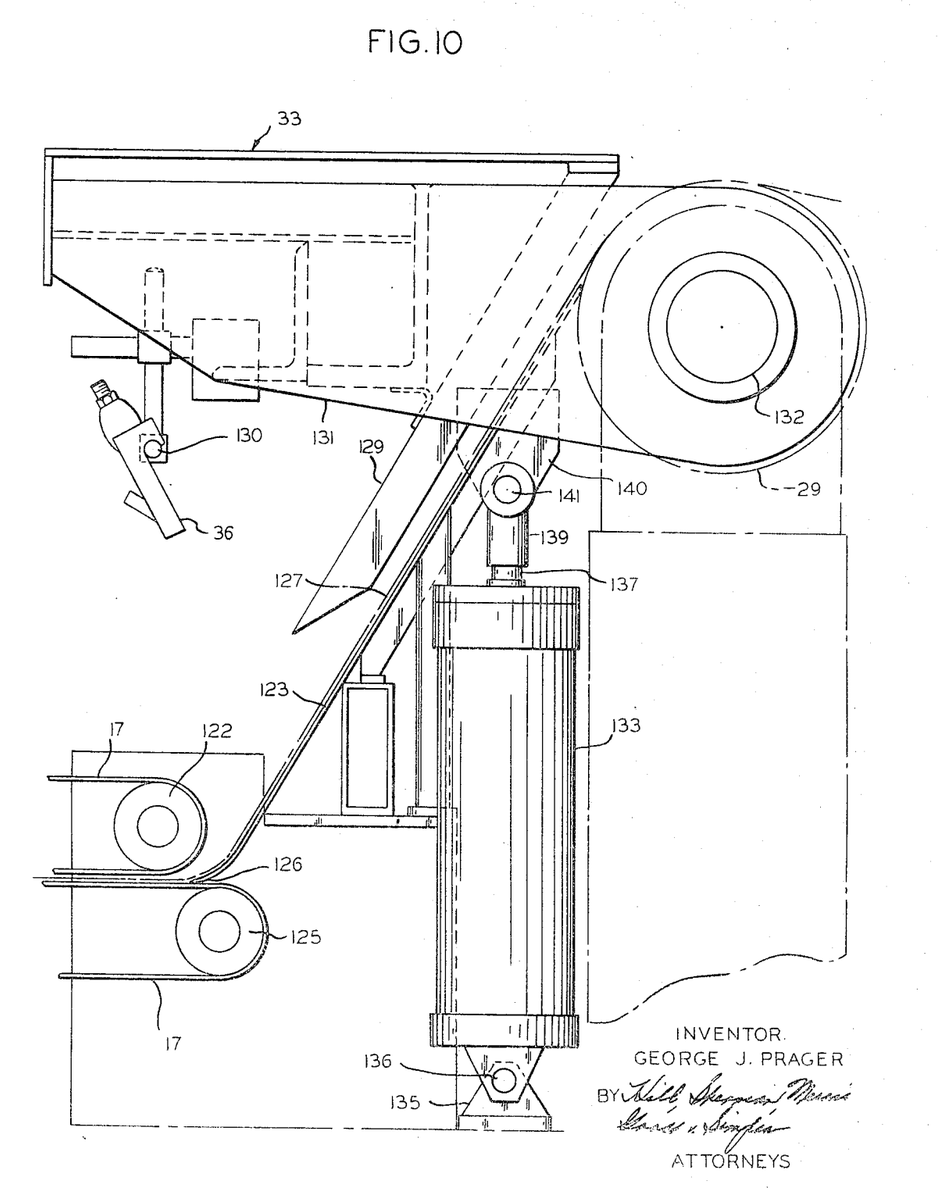
FIGURE 10 is an enlarged fragmentary detail view taken at the wrapping station, showing the discharge ends of the tape conveyors conveying the wrapper for wrapping a roll of paper together with a glue gun for gluing the wrapper, and the kicker for discharging the wrapped roll from the wrapping station for heading.

The edge banders 32, 32 are mounted on a transverse frame structure 143, for adjustable movement toward and from the center of the roll, to enable the bands to be placed in proper relation with respect to the roll. As shown in FIGURES 9 and 10, each edge bander 32 includes a pair of parallel spaced side plates 144 connected together by a base 145. The side plates 144 have an upper recessed portion 146 receiving a shaft 147 supporting a roll of banding tape 148. An air brake 149, engaging a brake drum 150 on the end of the shaft 147, is provided to retard rotation of the roll of banding tape and to maintain tension thereon. The banding tape is trained from the bottom of the roll between a pair of lower and upper pinch rolls 151 and 152. The upper roll 152 may be a steel rider roll floatingly mounted in spaced guides 153 mounted on the insides of the side plates 144. The roll 151 may be a resilient roll driven from a motor 155 through the chain and sprocket drive 156. A tension idler 157 is provided to maintain tension on the chain of the chain and sprocket drive.

The band is progressed by the pinch rolls 151 and 152 along a band guide 159 spaced beneath an upper band guide 160. The band then passes over an over-spray collector 161 beneath a spray gun 163, spraying the tape to be glued on the wrapper as it is progressed into nip between the wrapped roll of paper and the incoming rotatably driven drum 29.

The band is cut to length by a knife 164 on the end of an arm 165 transversely pivoted between the side plates 144 on a transverse shaft 166. A fluid operated cylinder and piston 167 is transversely pivoted at its head end between the side plates 144 on a transverse shaft 169 and has an extensible piston rod 170 pivotally connected to the arm 165, as by a pivot pin 171, to move the knife 164 downwardly into engagement with a block 173, which may be a wooden block, to cut the band to length.

The carriage or frame formed by the side plates 144 and base 165 has laterally spaced parallel plates 174 depending therefrom having rollers 175 mounted thereon and supported on tracks 176 spaced inwardly of channels 177 of the frame structure 143 and suitably mounted on the webs of said channels. One leg 174, shown in FIGURE 9 as being a left hand leg, has a bracket 179 secured thereto and extending inwardly therefrom and forming a support for a nut 180. The nut 180 may be a Saginaw nut and extends about and is threaded on a Saginaw ball screw 183. The Saginaw ball screw 183 extends for the length of the frame structure 143 and is driven from a positioning drive motor 184 through a coupling 185. A similar Saginaw nut (not shown) is connected with the opposite edge bander 32 to effect movement of the two edge banders 32 inwardly toward each other, upon rotation of the motor 184 in one direction and outwardly of each other upon the reversal in the direction of rotation of said motor.

The motor 184 may be energized to rotate in one direction or another under the control of a feeler (not shown), electric eye (not shown), or other mechanism detecting the ends of the roll and moving the edge banders into a predetermined position with respect to the ends of the roll, to accommodate the application of bands to the wrapped roll at selected distances from the ends of the roll. For example, edge bands may be placed on the wrapped roll adjacent the edge thereof while chafe bands may be placed on the roll inwardly of the edge bands.

The plate 174, shown in FIGURE 9 as being the right hand plate has a bracket 186 extending inwardly therefrom having a roller 187 rotatably mounted thereon and depending therefrom. The roller 187 extends within a slot 188 formed between the inner side of the track 176 and a block 189 spaced inwardly of said track, to maintain the edge banders in alignment while travelling toward and from each other into position to band the wrapper wrapped about a roll.

Figure 13:
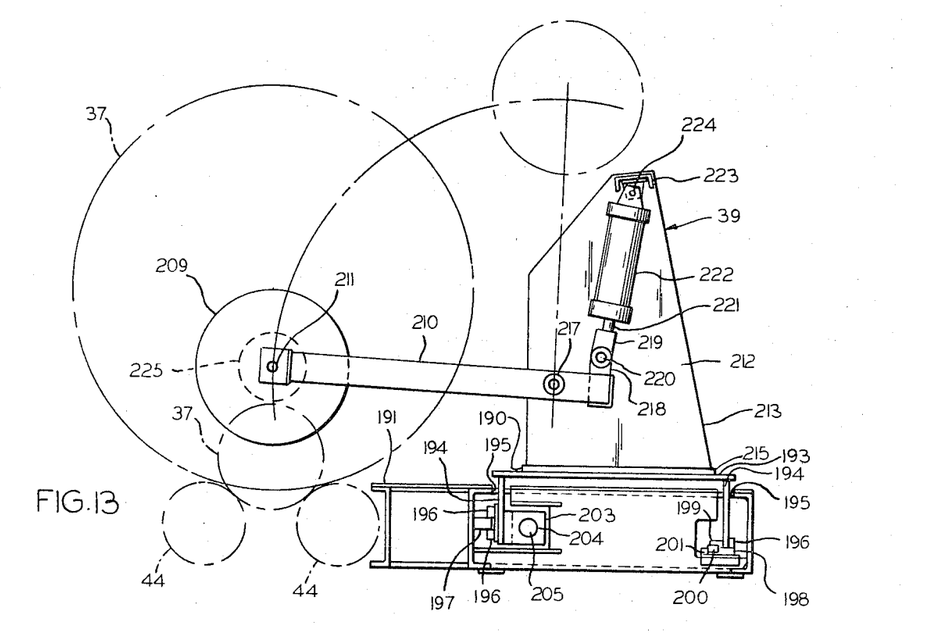
FIGURE 13 is a fragmentary, diagrammatic side elevational view of the crimper for crimping the overhanging portion of the wrapper along the ends of the roll of paper.
Figures 14, 15, 16:
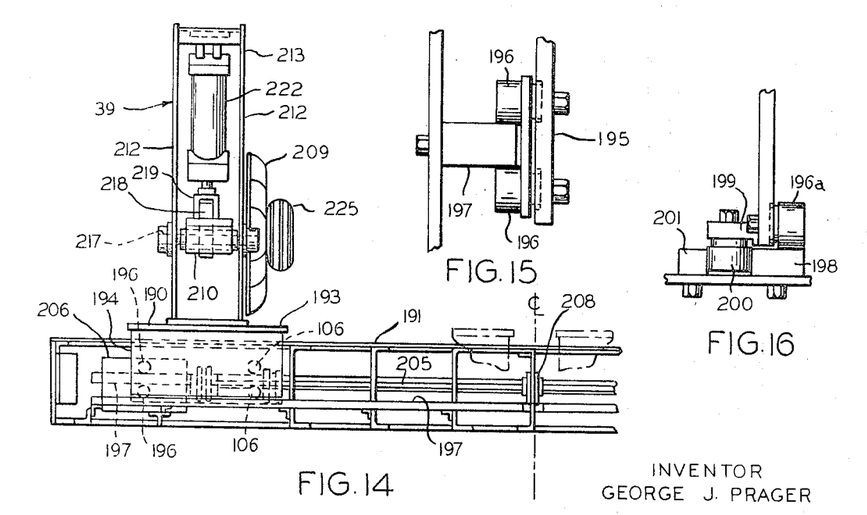
FIGURE 14 is an end view of one-half of the crimper shown in FIGURE 13.
FIGURE 15 is an enlarged fragmentary detail view showing a fragment of the support for the carriage for supporting the crimper.
FIGURE 16 is an enlarged fragmentary detail view showing the opposite side of the support and guide for the carriage from FIGURE 15.

A separate crimper 39 is provided for each end of the roll, for crimping the wrapper about the ends of the roll and conditioning the wrapper for the application of outside heads thereto. As shown in FIGURES 13 and 14, each crimper 39 is mounted on a carriage 190 movable transversely of a frame or table 191 toward and from the ends of a roll of paper 37, mounted on rotatably driven support drums 44. In the form of the invention shown in FIGURE 1 the crimper is on the outgoing sides of the drums 29, 29 and the roll of paper 37 is supported on said drums during the crimping operation. In the form of the invention shown in FIGURE 2, a separate crimping station is provided and the crimpers are on the incoming sides of the support drums 44, 44.

The carriage 190 has a top plate 193 spaced above the top of the table or frame 191 and has spaced roller brackets 194 depending therefrom through transverse slots 195 leading through the top of the table 191. The wheel brackets 194 are in the form of plates. The plate, shown in FIGURE 13 as being the left hand plate forms bearing supports for rollers 196 engaging the top and bottom surfaces of a track 197 and movable therealong. The roller bracket 194 on the side of the machine, shown in FIGURE 11 as being the right hand side of the machine, has rollers or wheels 196a journalled thereon and riding along a track 198. The roller bracket 194 on the right hand side of the machine also has a bracket member 199 extending inwardly therefrom and forming mountings for longitudinally spaced rollers 200 disposed thereunder and engaging the inner side of the track 198, and the outer side of a parallel spaced track 201. The spaced tracks 198 and 201 provide a guide slot within which the rollers 200 ride to retain the carriage 39 from lateral movement with respect to said rollers.

Figure 11:
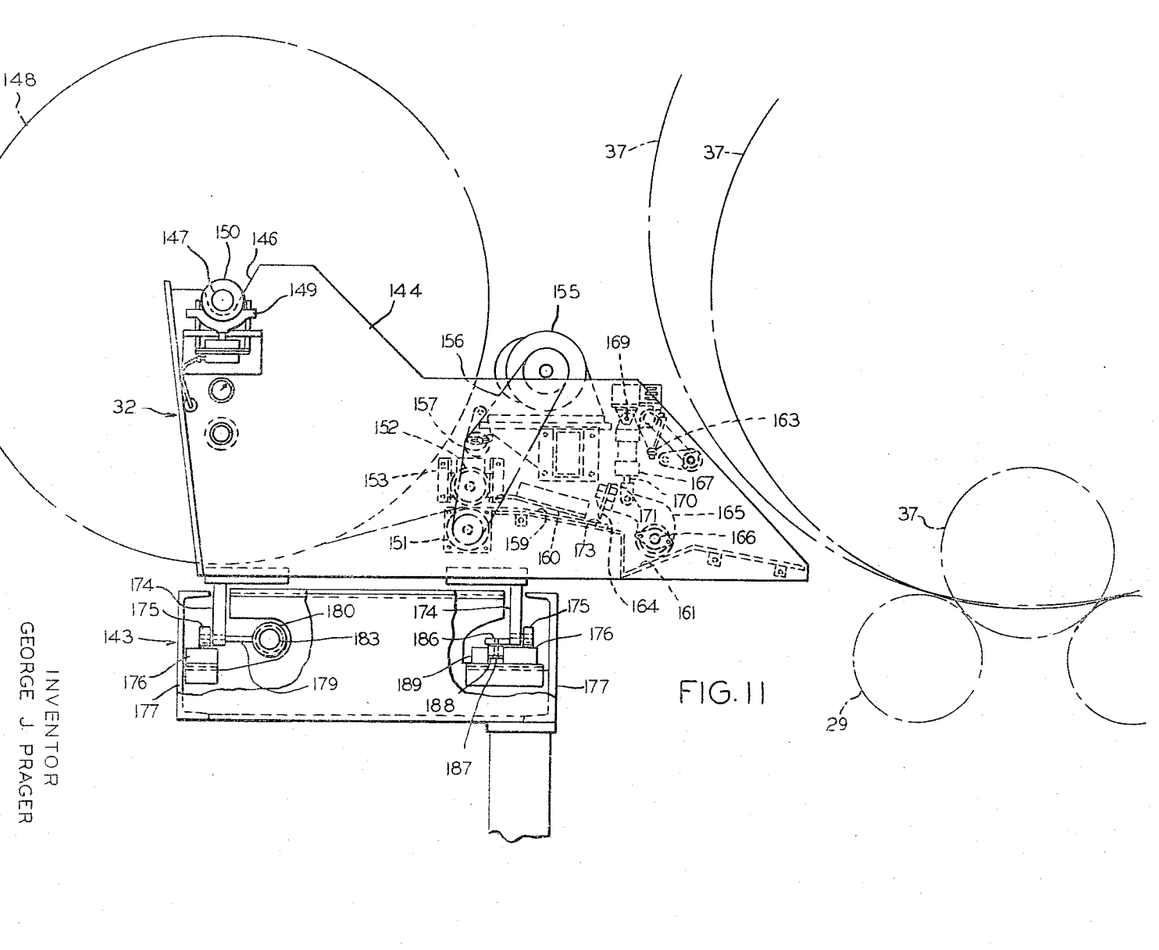
FIGURE 11 is a fragmentary view in side elevation of one of the tape applying devices for applying tape to either the end or intermediate the ends of the wrapped roll of paper.

The roller bracket 194 on the side of the crimper, shown in FIGURE 11 as being the left hand side of the crimper has a bracket 203 extending inwardly therefrom forming a support for a nut 204 threaded on a rotatably driven shaft 205. The nut 204, like the nut 180 may be a Saginaw nut to effect movement of the carriage 193 along the tracks 197 and 198 upon rotation of the shaft 205. A motor 206 is shown in FIGURE 14 as mounted beneath the top of the table or frame 191. The shaft 205 is journalled intermediate its ends in a bearing support 208. A shaft 205 has a Saginaw nut 204 threaded on its end portion opposite the crimper 39 shown in FIGURE 12, which is of an opposite hand from the nut 204 and is operatively connected with the opposite crimper 209, to effect movement of the two crimpers 39 inwardly toward each other in one direction of rotation of the motor 206 and outwardly away from each other in an opposite direction of the motor.

Rotation of the motor 206 may be controlled through the cyclic control system for the machine under the control of a feeler (not shown) or electric eye (not shown) to position a crimping wheel 209 in proper relation to crimp the wrapper around the end of the drum, and to reversely move the crimpers away from each other at the termination of a crimping operation, to accommodate transfer of the roll 37 to the header 45.

The crimping wheel 209 is rotatably mounted on the end of an arm 210 on a shaft 211. The arm 210 is transversely pivoted between side plates 212 of an upstanding post 213 extending upwardly of a base 215 forming on the top of the carriage 193. A transverse pivot pin 217 is mounted between the plates 212, 212 and forms a pivotal support for the arm 210 intermediate the ends of said arm. The end of the arm 210 between the plates 212 has an ear 218 extending upwardly therefrom pivotally connected to a connector 219 on a transverse pivot pin 220. The connector 219 is shown as being on the end of a piston rod 221 extensible from a cylinder 222 depending from a cross-frame member 223 and pivotally suspended therefrom as by a transverse pivot pin 224. The cylinder 222 may be an air cylinder. Air admitted to the head end of said cylinder will raise the crimping wheel 209 out of the path of a roll of paper 37 at the termination of a crimping operation. The admission of fluid under pressure to the piston rod end of the cylinder 222 will lower the crimping wheel 209 to engage and crimp the overhanging wrapper, as gauged by a gauge wheel 225 on the shaft 211.

Figure 12:
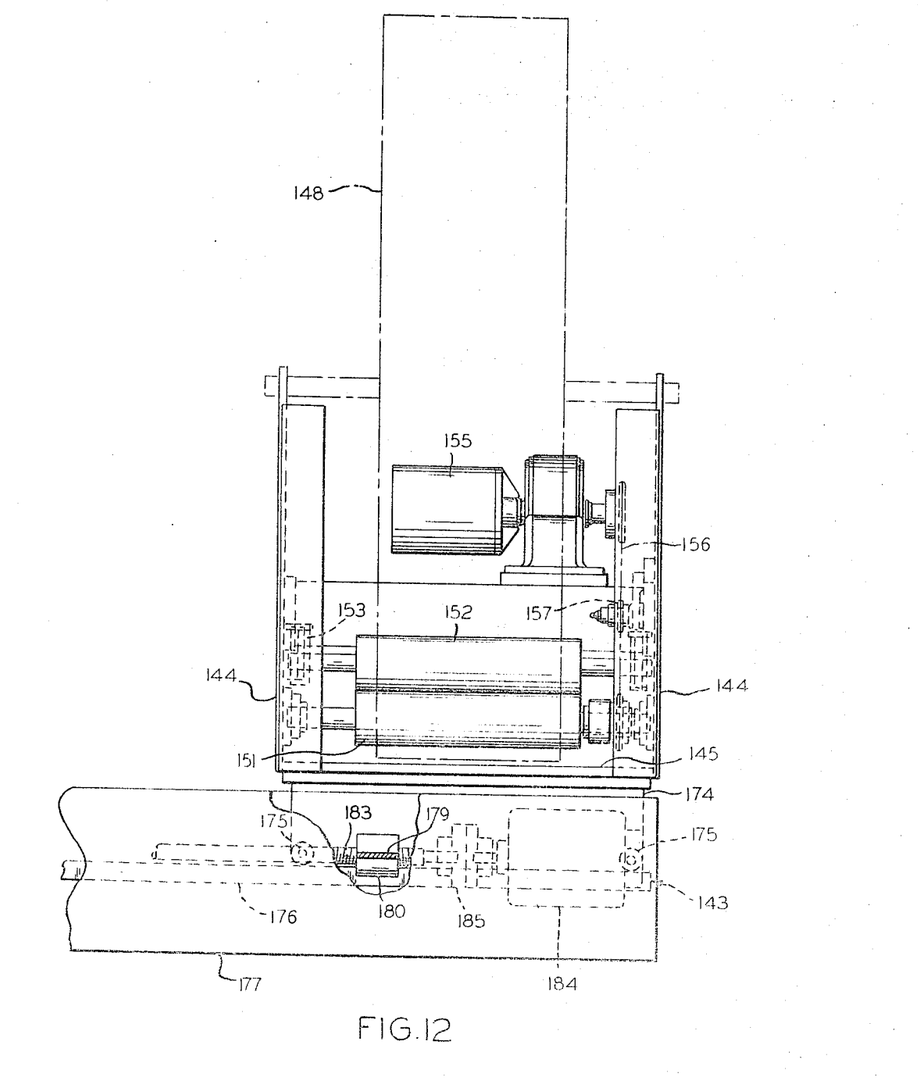
FIGURE 12 is a fragmentary end view of the tape applying device shown in FIGURE 11, with certain parts removed.

The gauge wheel 225 also has driving connection with the crimping wheel 209 and serves as a drive means therefor. The gauge wheel 225 is shown in FIGURE 12 as being in the form of a rubber tire, which may be inflatable. Thus as fluid under pressure is admitted to the piston rod end of the cylinder 222, it will lower the crimping wheel 209 to move downwardly along the end of the roll of paper and will engage the gauge or drive wheel 225 with the periphery of the roll of paper. The crimping wheel 209, as it is lowered to extend along side of the end of the roll of paper, thus folds the portion thereof along the end of the roll of paper, and as the roll rotates, the crimping wheel being rotatably driven by the gauge wheel 225, will crimp the overhanging end of the roll of paper inwardly into engagement with the end of the roll of paper 37, to condition the wrapper to have a head applied to the outside thereof.

It should here be understood that the two crimpers 39 operate simultaneously on opposite overhanging ends of the wrapper and may be moved inwardly and outwardly under the control of a feeler, electric eye, or a similar control device, and that the admission of fluid under pressure to the head and piston rod ends of the cylinders 222, to move the crimping wheel into position to crimp the wrapper over the end of the roll of paper may also be under the automatic conrtol for the machine. These operations, however, may be separately controllable by the operator of the machine if desired.

At the termination of the crimping operation, in the form of the invention illustrated in FIGURE 1, the conveyor 25 will raise the wrapped edge banded and crimped roll of paper above the support and drive drums 29. The kicker 33 will then come into operation and eject the wrapped roll of paper from the flights 90 of the conveyor 25 to roll along the ramp, onto support rails 227 of the header 35 (FIGURE 4). The support rails 227 are tilted by operation of a fluid pressure cylinder and piston 229, having a piston rod 230 extensible therefrom, in a manner similar to that shown and described in an application Ser. No. 447,219, filed on Apr. 12, 1965, by Ralph Derr, Jr., so not herein shown or described in detail.

As shown in FIGURE 4, the rails 227 extend along opposite sides of a transversely pivoted beam 231 pivoted in one direction to position the sloping surface of one rail 227 to generally form a continuation of the ramp 34 and to raise the sloping surface of the opposite rail to stop travel of the roll as it moves onto the header along the ramp 34. The beam 231 may then be moved into the upright roll supporting position shown in FIGURE 4 and held in this position during a heading operation.

Heading is attained by placing cardboard heads (not shown), which may be circular in form on header platens 233, 233 and retaining the heads to the inner surface of said platens by vacuum. The outside heads being glued on the sides thereof facing the crimped ends of the wrapper, are then moved inwardly by fluid under pressure admitted to cylinders 235, 235, extending outwardly of the platens to engage the outside heads with the crimped end portions of the wrapper, and to retain said heads to the crimped end portions of the wrapper until the glue sets.

At the termination of the crimping operation the beam 231 may be tilted in a direction, which in FIGURE 4 is shown as being a clockwise direction, to eject the wrapped and headed roll of paper onto the ramp 38 for further treatment, such as weighing and labeling, after which the wrapped roll of paper may be transported for use or storage.

In operation of either wrapping system shown in FIGURE 1 or in FIGURE 2, each station can be controlled manually if desired. In automatic operation the machine sets the pace rather than the operator and interconnections may be provided between each of the stations so that the operation which takes the longest length of time will dictate the pace of the machine. Thus, the machine may control itself and may measure the size of the rolls, including length and diameter at the centering station, which in turn may send a signal to the conveyor 25 and to the wrapper feed to effect the feed of a wrapper of selected width, and to condition the conveyor to receive a roll 37 and then elevate the roll and convey the roll to a wrapping station.

The centering platens 51 at the centering station 21 may determine the width of the wrapper to be selected and the transducer 85 or other gauging mechanisms may indicate the diameter of the roll and the amount of wrapper required to wrap a roll with one or two plies.

Movement of the conveyor 25 may be a step-by-step indexing movement, stopping travel of the conveyor each time it has moved a distance equal to the distance between two adjacent wrapping stations. Movement of the conveyor may be controlled by limit switches (not shown) or by any other suitable control mechanism.

An original signal fed into the machine by a punched card and the like may determine the type of wrapper, where multiple wrapping materials are available, and a stamping device may place a stamp on the head at the end of the wrapping line in accordance with the original identifying signal placed on the machine.

By providing the single station, aligned with the conveyor, for wrapping, edge banding and crimping and providing a cascade arranged header, a compact and efficient wrapping system may be provided requiring a minimum of floor space, and by arranging the wrapping stations in aligned relation with respect to each other, a series of wrapping operations may be provided on a plurality of in-line rolls of paper either of the same width and diameter or of intermingled widths and diameters without interrupting the wrapping operation, the widths and lengths of paper required all being telegraphed to the feed and cut-off from the entering end of the machine, where the operation is an automatic wrapping operation.

While I have herein shown and described one form in which the invention may be embodied, it may readily be understood that the machine may wrap other materials than rolls of paper and that various variations and modifi-

I claim as my invention:

1. In an apparatus for wrapping rolls of paper,
a centering stand having troughed roller support means supporting a roll of paper for movement along its axis of rotation,
axially movable means movable inwardly of opposite ends of said troughed roller support means for bringing a roll of paper into centered relation with respect to said troughed roller support means.
a conveyor in cascade relation with respect to said centering stand and movable axially of the center of rotation of the roll of paper and supporting and carrying a centered roll of paper deposited thereon by said centering stand for a wrapping operation,
said conveyor traveling in increments of length equal to the distances between wrapping stations to bring a centered roll of paper to be wrapped into centered relation with respect to an axially aligned wrapping station,
and means elevating said conveyor at the initiation of a conveying operation and lifting the roll of paper and conveying the roll of paper to a wrapping station and lowering the conveyor and the roll of paper thereon to be supported at a wrapping station in centered relation with respect thereto at the termination of a conveying operation.

2. In an apparatus for wrapping rolls of paper,
a centering station including a frame having trough roller support means mounted thereon, supporting a roll of paper for axial movement along its axis of rotation,
axially movable means movable inwardly of opposite ends of said roller support means for bringing a roll of paper into centered relation with respect to said centering station,
a ramp at the outgoing end of said centering station,
means tilting said frame and troughed roller support means to discharge a roll of paper therefrom for rolling movement along said ramp, and a conveyor at the discharge end of said ramp in roll receiving relation with respect to said centering stand and movable in the direction of the axis of rotation of the roll for conveying a roll of paper in the direction of its axis of rotation for a wrapping operation,
said conveyor travelling in increments of length equal to the distance between wrapping stations to bring a centered roll of paper into centered relation with an axially aligned wrapping station, and being movable vertically to lift a roll of paper for conveying between stations, and to lower the roll of paper at a wrapping station.

3. In an apparatus for wrapping rolls of paper,
a centering stand including a frame having troughed roller support means journalled therein for supporting a roll of paper for movement along its axis of rotation,
axially movable platens movable inwardly of opposite ends of said roller support means for bringing a roll of paper into centered relation with respect to the centering station,
a pair of parallel spaced rotatable support drums disposed to one side of said centering stand in cascade relation with respect thereto and extending in the direction of the axis of rotation of the roll of paper,
a conveyor movable between said drums and having roll supporting flights thereon for supporting and conveying a roll of paper in the direction of its axis of rotation,
means tilting said frame and troughed rollers to discharge a roll of paper onto said drums,
means lowering said conveyor and flights to accommodate the roll of paper to be supported on said drums and raising said conveyor and flights above said drums to lift the roll of paper above said drums and accommodate the roll of paper to be carried to a wrapping station.

4. In an apparatus for wrapping rolls of paper,
a centering stand including a frame having troughed roller support means rotatably mounted thereon for movement about axes extending transversely of the axis of rotation of the roll of paper,
supporting a roll of paper for axial movement therealong,
axially movable platens movable inwardly of opposite ends of said roller support means for engaging the ends of a roll of paper on said troughed roller support means and bringing the roll of paper into centered relation with respect to said centering stand,
a conveying station in cascade relation with respect to said centering stand including a pair of parallel spaced roll support drums, and a conveyor movable in the space therebetween,
a wrapping station in advance of said drums including a pair of rotatably driven support drums in axial alignment with said first mentioned drums,
means tilting said frame and troughed rollers for discharging a roll of paper onto said first mentioned drums,
and means elevating said conveyor and lifting the roll of paper from said first mentioned drums and conveying the roll of paper into centered relation with respect to said wrapping station and then lowering the roll of paper onto said rotatably driven drums at said wrapping station.

5. In an apparatus for wrapping rolls of paper,
a centering stand including a frame having troughed roller support means rotatably mounted thereon,
supporting a roll of paper for axial movement therealong,
axially movable platens movable inwardly of opposite ends of said roller support means for bringing a roll of paper into centered relation with respect to said centering stand,
a pair of parallel spaced rotatable support drums disposed to one side of said centering stand in roll supporting relation with respect thereto,
a wrapping station spaced axially of said support drums and including a pair of rotatably driven support drums in axial alignment with said first-mentioned drums,
a conveyor movable along said drums in the spaces therebetween,
said conveyor having roll supporting flights supporting and conveying the roll of paper in the direction of its axis of rotation to said wrapping station, and lowering a roll of paper on said wrapping station in centered relation with respect thereto, and being driven in increments of length equal to the distance between stations, to center a centered roll of paper deposited on said conveyor in centered relation with respect to a station, at the termination of operation of the conveyor.

6. In an apparatus for wrapping rolls of paper,
a centering station,
axially aligned conveying and wrapping stations disposed to one side of said centering station,
said conveying station including a pair of spaced freely rotatable drums in roll receiving relation with respect to said centering station,
said wrapping station comprising a pair of spaced rotatably driven support drums in axial alignment with said drums of said conveying station,
conveying means disposed between said drums and having roll supporting flights thereon,
said conveying means being vertically adjustable to recess said flights below the roll supporting surfaces of said drums and to raise said flights above the roll supporting surfaces of said drums and to lift a roll of paper thereabove for conveying from one station to the other, and said conveyor being driven in increments of length of travel equal to the distance between said stations.

7. In an apparatus for wrapping rolls of paper,
a centering station,
a conveying station disposed to one side of said centering station in roll receiving relation with respect thereto,
said centering station including a frame having a series of troughed rollers supported thereon, supporting a roll of paper for axial movement therealong into centered relation with respect to said centering station,
and having platens movable inwardly toward each other for centering a roll of paper on said centering station,
means tilting said troughed rollers to discharge a roll of paper supported thereon onto said conveying station,
a wrapping station in axial alignment with said conveying station,
said conveying station and said wrapping stations each including a pair of spaced rotatable support drums for supporting a roll of paper thereon, and said conveying station including a conveyor having flights disposed between said drums for conveying a roll of paper along said drums,
said conveyor being vertically adjustable to recess said flights below the roll supporting surfaces of said drums and to raise said flights above the roll supporting surfaces of said drums to lift a roll of paper above the roll supporting surfaces of said drums and to convey a centered roll of paper along said drums,
said conveyor being movable in step-by-step relation to convey a roll of paper the distance between stations for each step-by-step operation of said conveyor to assure the centering of the roll of paper at said wrapping station.

8. A roll wrapping apparatus comprising,
a centering station,
axially aligned conveying and wrapping stations disposed to one side of said centering station,
said centering station including a series of troughed rollers supporting a roll of paper for movement along its axis of rotation,
a support frame for said rollers tiltable about an axis extending transversely of the axes of rotation of said rollers and parallel to the axis of rotation of the roll of paper supported on said rollers,
a ramp between said centering station and said conveying station,
means tilting said frame and rollers to effect the discharge of a roll of paper from said troughed rollers onto said ramp to roll to said conveying station,
said conveying station and said wrapping station each drums disposed to one side of said centering station and extending parallel thereto in axial relation with respect to the axis of rotation of a roll to be wrapped,
said support drums of said wrapping station being rotatably driven to effect the wrapping of a roll of paper with a wrapper web passing in the nip between said support drum and the roll of paper supported thereon,
said wrapping station also including a glue applicator applying glue to the leading and trailing ends of the wrapper on the side thereof facing the roll of paper,
banders movable toward and from each other in accordance with the length of the roll of paper, for banding the roll of paper and disposed at the incoming side of said wrapping station,
crimpers at the outgoing side of said wrapping station mounted for movement toward and from each other in accordance with the length of the roll, for crimping the wrapper to the ends of the roll,
a kicker at the incoming side of the wrapping station for kicking a roll of paper therefrom for heading, and
a header spaced from the outgoing side of the wrapping station for applying outside heads to the crimped ends of the wrapped roll.

9. An apparatus for wrapping rolls of paper comprising
a centering station and separate axially aligned longitudinally spaced wrapping, banding and crimping stations disposed to one side of said centering station,
each station having a pair of parallel spaced rotatably driven support drums rotatable about axes parallel to the axis of rotation of a roll of paper and in axially aligned relation with respect to each other,
a flight conveyor having roll supporting flights thereon movable along the space between said drums,
said conveyor being vertically adjustable to recess said flights beneath the roll supporting surfaces of said drums and to lift said flights to lift a roll of paper supported thereon above the roll supporting surface of said drums,
and said conveyor being driven in increments of length equal to the distances between stations, to convey a roll of paper thereon from a position in centered relation with respect to one station to a position in centered relation with respect to the next adjacent station during each cycle of travel of the conveyor.

10. An apparatus for wrapping rolls of paper comprising
a centering station and separate axially aligned longitudinally spaced wrapping, banding and crimping stations disposed to one side of said centering station,
each station having a pair of parallel spaced rotatably driven support drums rotatable about axes parallel to the axis of rotation of a roll of paper and in axially aligned relation with respect to each other,
a flight conveyor having roll supporting flights thereon movable along the space between said drums,
said conveyor being vertically adjustable to recess said flights beneath the roll supporting surfaces of said drums and to lift said flights to lift a roll of paper supported thereon above the roll supporting surfaces of said drums,
and said conveyor being driven in increments of length equal to the distances between stations, to convey a roll of paper thereon from a position in centered relation with respect to one station to a position in centered relation with respect to the next adjacent station during each cycle of travel of the conveyor,
a heading station arranged in cascade relation with respect to said crimping station,
and a kicker on the opposite side of said crimping station from said heading station for kicking a roll of paper from said conveyor flights at said crimping station, to said heading station.

11. In an apparatus for centering rolls of paper,
a stand having a track extending therealong,
a frame disposed above and extending along said track,
a series of laterally and longitudinally spaced troughed rollers journalled in said frame for rotation about axes extending perpendicular to said track,
a pivotal mounting for said frame on said stand, mounting said frame on said stand for movement about an axis extending parallel to said track,
fluid pressure cylinder and piston means connected between said stand and frame for tilting said frame and rollers about the axis of pivotal connection of said frame to said stand,
spaced centering platens guided for movement along said track toward and from each other, at least one endless chain connected with said platens for moving said platens toward each other at the same rates of speed and engaging a roll on said troughed rollers and moving the roll therealong into centered relation with respect thereto, a motor, and a drive connection from said motor to said chain for driving said platens toward and from each other by power.

12. An apparatus for centering rolls of paper in accordance with claim 11 wherein individual chains are provided for moving said platens toward and from each other at the same rates of speed, and wherein said motor is a stalling fluid pressure operated motor, stalling upon centering of the roll of paper.

13. An apparatus for centering rolls of paper for wrapping comprising an upright stand extending upwardly of the ground and having parallel beams supported thereon at the upper end thereof, said beams having vertically spaced parallel flanges forming tracks, a carriage at each end of said beam, each carriage having a pair of vertically and longitudinally spaced rollers rotatably journalled thereon having rolling engagement with said tracks, a roll centering platen extending upwardly of each carriage, a frame extending along said track on opposite sides of said carriages and platens, laterally and longitudinally spaced troughed rollers rotatably journalled in said frame and forming a rolling support for a roll of paper, accommodating the roll of paper to be moved therealong in the direction of its axis of rotation, a pair of endless chains extending along said stand, each having operative connection with one of said carriages, a drive motor for driving said endless chains at the same rates of speed and moving said platens toward each other at the same rates of speed to center a roll on said rollers, a pivotal mounting for said frame on said stand mounting said frame on said stand for movement about an axis extending transversely of the axes of rotation of said troughed rollers and spaced outwardly of one of said tracks, a fluid pressure cylinder and piston mounted on said stand and having operative connection with said frame at the opposite side thereof from said axis of pivotal connection of said frame to said stand, for tilting said frame and troughed rollers at the termination of a centering operation, and thereby ejecting a roll for further treatment.

14. A centering apparatus in accordance with claim 13 wherein the motor for driving the endless chain is a stalling fluid pressure operated motor driving said platens toward each other at the same rates of speed to move a roll of paper along said troughed rollers into a centered position and stalling upon the centering of the roll of paper, to accommodate discharge thereof.

15. An apparatus for banding the wrappers of wrapped rolls of paper comprising a pair of parallel spaced rotatably driven roll support drums, a frame structure extending for substantially the length of said drums to one side thereof and parallel thereto, a track extending along said frame structure, a carriage disposed above said frame structure and supported on said tracks for movement therealong, a stand on said carriage supporting a roll of banding material, brake means on said stand retarding rotation of the roll of banding material, a pair of pinch rolls feeding the banding material to said drums, a motor for driving said pinch rolls, a guide extending from said pinch rolls to a position adjacent said drums, said guide having a cut-off block therein intermediate the ends thereof, a knife cooperating with said cut-off block for cutting the banding material to length, a spray gun on the outgoing side of said knife for spraying the banding material with glue, and motor driven means for moving said carriage along said tracks into position to band rolls of various lengths at various positions along the lengths of said rolls.

16. A banding apparatus in accordance with claim 15 wherein two carriages are mounted on said tracks for operative association with opposite ends of a roll of paper, wherein said motor drive means moves said carriages along said track toward and from each other in accordance with the required positions of the bands on the wrapped roll, and wherein the drive from said motor to said carriages is a threaded shaft and nut drive, with individual nuts of opposite hands connected with each carriage.

17. In an apparatus for crimping the projecting end portions of wrapping paper wrapped about a roll of paper to the ends of the roll of paper, a frame, support drums for the roll of paper extending longitudinally of said frame and rotatably driven to rotate a roll of paper supported thereon, a carriage mounted on said frame at each end thereof and to one side of said drum, said carriages being movable along said frame toward and from each other, each carriage having an arm transversely pivoted thereto for movement over the space between said drums and having a crimping wheel mounted on the end thereof for crimping the projecting portion of the wrapper to a roll of paper on said support drum, fluid operated cylinder and piston means moving said arm and the crimping wheel supported thereon towards the roll of paper to effect a crimping operation, and means driving said crimping wheel by rotational movement of the roll of paper comprising a gauge and drive wheel coaxial with said crimping wheel and having driving connection therewith and engaged with the periphery of a wrapped roll of paper by said cylinder and piston means, to be driven therefrom.

References Cited
UNITED STATES PATENTS

| | | | |
|---|---|---|---|
| 2,803,935 | 8/1957 | Gibson | 53—380 |
| 2,880,560 | 4/1959 | Gibson | 53—211 X |
| 2,965,213 | 12/1960 | Kugler | 198—105 X |

TRAVIS S. McGEHEE, *Primary Examiner.*

FRANK E. BAILEY, *Examiner.*

R. L. FARRIS, L. S. BOUCHARD, *Assistant Examiners.*